United States Patent
Milojicic et al.

(10) Patent No.: US 10,846,016 B2
(45) Date of Patent: Nov. 24, 2020

(54) ENFORCEMENT OF MEMORY REFERENCE OBJECT LOADING INDIRECTION

(71) Applicant: HEWLETT PACKARD ENTERPRISE DEVELOPMENT LP, Houston, TX (US)

(72) Inventors: Dejan S. Milojicic, Palo Alto, CA (US); Leonid Azriel, Palo Alto, CA (US); Lukas Humbel, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 494 days.

(21) Appl. No.: 15/789,155

(22) Filed: Oct. 20, 2017

(65) Prior Publication Data

US 2019/0121574 A1    Apr. 25, 2019

(51) Int. Cl.
*G06F 9/00* (2006.01)
*G06F 3/06* (2006.01)
*G06F 12/08* (2016.01)

(52) U.S. Cl.
CPC .......... *G06F 3/0659* (2013.01); *G06F 3/0604* (2013.01); *G06F 3/0673* (2013.01); *G06F 12/08* (2013.01)

(58) Field of Classification Search
CPC ....................................................... G06F 9/32
See application file for complete search history.

(56) References Cited

U.S. PATENT DOCUMENTS

| 5,396,625 A * | 3/1995 | Parkes ..................... G06T 9/008 |
| 2006/0090063 A1* | 4/2006 | Theis ..................... G06F 8/4451 712/239 |
| 2017/0139594 A1 | 5/2017 | Ahn et al. |
| 2017/0139836 A1 | 5/2017 | Dittmann |

OTHER PUBLICATIONS

Azriel et al., "Memory-Side Protection With a Capability Enforcement Co-Processor", ACM Transactions on Architecture and Code Optimization, vol. 16, No. 1, Article 5, Mar. 2019, 26 pages.

(Continued)

*Primary Examiner* — Grace Park
(74) *Attorney, Agent, or Firm* — Fabian VanCott

(57) ABSTRACT

In one example in accordance with the present disclosure, enforcement of memory reference object loading indirection is described. According to a method, at a register, it is determined from an indirection counter of a first memory referencing object (MRO) in one of a number of registers of a processor of the computing device, whether a second MRO is loadable. When the indirection counter of the first MRO indicates a second MRO is loadable, the second MRO is loaded from the memory device to one of the number of registers. The second MRO also includes an indirection counter. The indirection counter of the loaded second MRO is changed, at the register that contains it, based on the indirection counter of the first MRO to enforce a degree of MRO loading indirection. Further, MRO loading is prohibited when an indirection counter reaches zero by invalidating a capability counter of a subsequent MRO at the register.

17 Claims, 5 Drawing Sheets

(56) References Cited

OTHER PUBLICATIONS

Robert Watson, "CHERI Publications", available online at <https://www.cl.cam.ac.uk/research/security/ctsrd/cheri/cheri-publications.html>, 2010-2019, 5 pages.
Watson et al., "Capability Hardware Enhanced RISC Instructions: CHERI Instruction-Set Architecture (Version 6)", Technical Report No. 907, Apr. 2017, pp. 1-307.
Bytes; "How Many Levels of Pointers Can You Have?"; 2005; 50 pages.
Lefohn, et al; "Implementing Efficient Parallel Data Structures on GPUs"; Apr. 15, 2005; 37 pages.
Sergey, et al; "Falsification of Java Assertions Using Automatic Test-case Generators"; 2016; 154 pages.

* cited by examiner

ENFORCEMENT OF MEMORY REFERENCE OBJECT LOADING INDIRECTION

BACKGROUND

Graphs are data structures that include nodes that are connected by edges. Each of the nodes can represent a different entity and the edges connecting them represent links between nodes. Graphs can be used to represent a variety of computing environments. For example, social networks can be represented as a graph with each node corresponding to a user and edges between the nodes representing a social connection between the user nodes. Additionally, other types of information, or topographies, can be represented using graph data structures.

While such graph data structures provide an effective way to organize and manage data such that it can be effectively manipulated, some aspects limit their more complete implementation. For example, some graph data structures include memory reference objects (MROs) that can either call data from memory, or can call other MROs from memory. An example of a memory reference object is a capability which is a form of a pointer. That is, the capability can be used to access data that it points to or to access different pointers. Capabilities also offer increased data security. For example, if a hacker, or other individual, attempts to copy the capability, or otherwise alter the capability, the capability gets erased, thus ensuring data security and protection. These capabilities, provide fine grain data protection by enabling access to small size objects, when navigating through a graph data structure. The capabilities include extra bits that provide this additional security. An instruction set architecture (ISA) of a central processing unit (CPU) enables hardware-supported enforcement of capabilities. That is, the ISA includes registers that contain rules for interpreting the capabilities and logic that executes the capabilities. Note that other enforcement mechanisms may be implemented as well. These capabilities, while providing increased security, are graph agnostic. That is, capabilities can be limited to loading other capabilities or data, but cannot be set such that a predetermined level of indirection is enforced.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
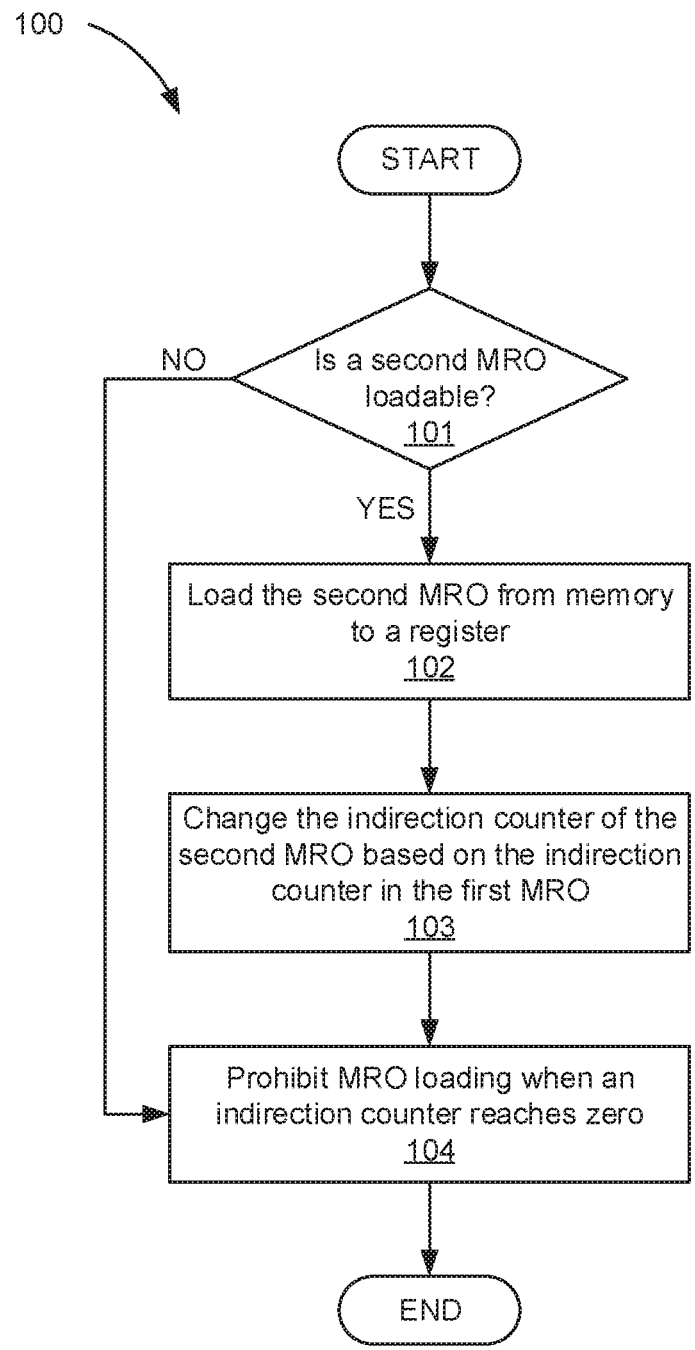
FIG. 1 is a flowchart of a method for enforcing memory reference object (MRO) loading indirection, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Methods and systems for enhancing ISA support, in one example, of capabilities and other MROs, are described herein. Specifically, the present system and methods accommodate for the increased security provided by MROs such as capabilities, but also increase their effectiveness in operating on a graph data structure. Specifically, the present specification describes methods and systems that allow for reducing an amount of indirection within the graph data structure. Enforcing, or limiting, a degree of indirection within the graph data structure permits the selective limiting of access to the graph. For example, such an indirection enforcement mechanism dictates how many friends of friends a user can see, or how many connections of a connection a user can approach.

As used in the present specification, indirection refers to a chain of MROs that are referenced by other MROs. That is, an environment where a first MRO references a subsequent MRO is described as having one level of indirection. By comparison, when the subsequent MRO points to a third MRO, there are two levels of indirection. The present specification enforces a set amount, degree, or level of indirection, which enhances the ISA-supported MRO enforcement to better match the characteristics of graph-based or pointer-heavy applications.

Specifically, the present specification describes enforcement of a desired degree of MRO indirection. That is, if a desired indirection level of 2 is set, the third MRO from the above example is prohibited from being loaded into the CPU registers. This is done via indirection counters included with each MRO. While specific reference is made to sequentially reducing a degree of indirection, other operations are possible for enforcing MRO indirection. For example, a level of indirection may be unlocked, meaning an unlimited number of dependent MROs may be loaded. Such a case might exist when an administrator would like free access to all nodes in the graph, and not a limited subset.

In various examples, a first memory referencing object (MRO) exists on one of a number of registers of a processor of the computing device. The first MRO comprises an indirection counter. At the register where the first MRO is loaded, it is determined whether a second MRO is loadable, which determination is based on the indirection counter from the first MRO. When the indirection counter of the first MRO indicates a second MRO is loadable, the second MRO is loaded from the memory device to the same register or a different register. The second MRO also includes an indirection counter, which is changed, at the register to which it is loaded, based on the indirection counter of the first MRO to enforce a degree of MRO loading indirection. When an indirection counter reaches zero, further MRO loading is prohibited.

The present specification also describes a system for enforcing degrees of indirection. The system includes a memory device. The memory device includes a number of memory reference objects (MROs). Each MRO includes an indirection counter to indicate a level of indirection allowed. The indirection counter is altered based on an MRO from which it is loaded. The system also includes a processor. The processor includes a number of registers to load an MRO and its associated indirection counter from the memory device. The processor also includes a controller to enforce an allowed level of indirection on a graph data structure.

In another example, at a register of a processor, it is determined whether a second capability is loadable, which determination is based on an indirection counter of a first capability in one of a number of registers. When the indirection counter of the first capability indicates a second capability is loadable, the second capability is loaded from the memory device to the same register or a different register. The second capability also includes an indirection counter, which is set, at the register to which it is loaded, to a value one less than the indirection counter of the first capability. When an indirection counter reaches zero, 1) further MRO loading is prohibited and 2) data loading is permitted even when the indirection counter is zero.

In other words, the present specification describes a recursive process where each loaded MRO or capability is processed in the same way. Specifically, for each loaded MRO, it is determined whether a subsequent MRO is loadable, and if so, the MRO is loaded and its indirection counter value updated.

In summary, using such an indirection enforcing system 1) provides hardware support for enforcing a level of indirection in traversing data structures with pointers; 2) provides a simple interface for such enforcement; 3) provides a more secure data navigation structure; and 4) provides for customization in limiting MRO indirection. However, it is contemplated that the systems and methods disclosed herein may address other matters and deficiencies in a number of technical areas.

As used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may or may not be included in other examples.

FIG. 1 is a flowchart of a method (100) for enforcing memory reference object (MRO) loading indirection, according to an example of the principles described herein. That is, a memory device of a computing device stores data and MROs. An MRO is an object within a data structure that points to another value or another MRO within a memory structure. A capability is one example of a particular type of MRO. A capability is an unforgeable token that can be used to protect memory at a very fine granularity. In general, capabilities include a base, an offset, a length, and protection bits. The length defines a region of memory that a capability can access, counting from the base of the capability. An offset of the capability indicates an individual memory access target. Protection bits of the capability indicate what access is granted to the capability.

As described above, these MROs can call other MROs or can call data. As an example, an MRO is loaded into a register of a processor that supports the MRO. Specifically, the capability may be loaded into a capability register of a processor. From this capability register, the capability can be further referenced and/or processed. The capability includes additional information such as additional protection information. A pointer may include 64 bits, but the additional information stored in a capability may extend up to 128 bits.

In this example, each MRO includes an indirection counter. The indirection counter is used to enforce a degree of allowed indirection. In some examples, the indirection counter is a bit, or a set of bits, that indicate the degree of allowed indirection. For example, an indirection counter set to 1 indicates that one additional MRO may be loaded from the MRO, after which, no more MROs may be loaded from a previous MRO. That is not to say that data is not loadable from subsequent MROs, just that no additional MROs may be loaded.

It is then determined (block 101), at the processor register where the first MRO is, and from the indirection counter of a first MRO, whether a second MRO is loadable. For example, if the indirection counter of the first MRO is zero, (block 101, determination NO), then subsequent MRO loading is prohibited (block 104). Thus a certain degree of indirection is enforced. By comparison, if the indirection counter of the first MRO is non-zero, (block 101, determination YES), then the second MRO, which is referenced by the first MRO, may be loaded (block 102) into a processor register, which may or may not be the same register where the first MRO is loaded. The registers that receive and interpret the MROs, and the instructions that process the MROs may be included in an instruction set architecture (ISA) that is unique to processing MROs.

With the second MRO loaded (block 102), the system can be said to have one level of indirection. In this example, the indirection counter of the second MRO is changed (block 103) based on the indirection counter of the first MRO. The changing (block 103) of the indirection counter of the second MRO, or any MRO, is based on rules stored in the registers of the processor and executed by a controller of the processor. That is, a rule that indicates how to change the indirection counter of the second MRO is loaded into embedded capability registers of the processor and logic inside of the instruction set architecture (ISA) of the processor executes them.

According to one rule, the indirection counter of the second MRO can be set to a value one less than the indirection counter of the first MRO. In this example, the initial value of the indirection counters of the MROs within the memory may be set to a desired degree of allowed indirection.

There may be other rules as well that dictate how an indirection counter of a second MRO can be changed (block 103). For example, changing (block 103) at the registers, an indirection counter of the second MRO can include setting the indirection counter of the second MRO to one less than whichever of the first indirection counter and the second indirection counter is the lowest. For example, after loading, the first MRO may have a value of 2 and the second MRO may have a value of 0. In this example, the indirection counter of the second MRO may be set to 1.

In another example, an indirection counter of the second MRO may be unlocked, that is there may be no restrictions on a degree of indirection for a data graph structure. This rule may be used when an administrator desires to be able to navigate the entire graph data structure, and not just a limited subset.

While specific reference is made to particular rules, i.e., a rule to reduce the second MRO indication to one less than the first MRO indirection counter, in some cases multiple rules may be combined. For example, some rules determine a priority between competing indirection counters, specifically of the loaded MRO and the MRO that is being loaded.

For example, the loaded first MRO may indicate that it is not allowed to load any MRO, just data. The second MRO to be loaded may indicate that unlimited additional MROs can be loaded. Accordingly, the rules in the register can determine whether to ignore the indirection counter of the first MRO based on the indirection counter of the second MRO.

Again, while particular reference is made to particular rules, any number of rules can be implemented in accordance with the principles described herein. Accordingly, the variety of rules provides a variety of ways to enforce a desired indirection on a graph data structure.

Once any indirection counter of any MRO is set to zero, then subsequent MRO loading is prohibited (block 104). In some example, prohibiting (block 104) MRO loading may include invalidating a capability loading indicator such as a capability loading bit within the MRO. That is, each MRO may have a capability loading bit that indicates whether that particular MRO is permitted to load another MRO. A valid capability loading bit indicates that the MRO is permitted to load another capability. Accordingly, by invalidating the capability loading bit of a particular MRO, that MRO can no longer load additional MROs.

A specific example of the method (100) is now provided. In this example, a first MRO is present in the capability registers of the processor, which MRO has an initial indirection counter value of 2, indicating that two degrees of allowed indirection are set for the data structure. As a specific example of 2 degrees of indirection, a social networking site may desire to allow users to access content from their direct social connections as well as $2^{nd}$ degree connections, and $3^{rd}$ degree connections. Note that in this example, the first MRO may have been processed as described above, that is it may have been loaded and had its indirection counter adjusted based on the MRO from which it was loaded. That is, the way in which the second MRO is to be processed is similar to how the first MRO is processed.

In this example, the first MRO is loaded, and as the indirection counter for the first MRO is 2, and not zero, a second MRO is loadable, and consequently loaded. In this example, the indirection counter for the second MRO may be set to 1, i.e., one less than the first MRO indirection counter. The sequence then continues by determining that, because the second MRO indirection counter is 1, and therefore not zero, a third MRO can be loaded and is loaded. In this example, the third MRO indirection counter is then set to zero, or one less than the second MRO indirection counter. As a result, subsequent MRO loading (block 104) is prohibited. In other words, the third MRO cannot be used to load other MROs even if, on its own, the third MRO does not have such a traversal limitation.

The above described method (100) facilitates a more secure use of graph data structures, by using certain types of memory reference objects that provide increased security, such as capabilities. The method (100) also increases the efficiency of using these types of MROs to navigate graph data structures by incorporating graph and pointer traversal with ISA-supported capabilities. Thus the present system enforces, at a hardware level, i.e., the register of the processor, a desired level of indirection.

Figure 2:
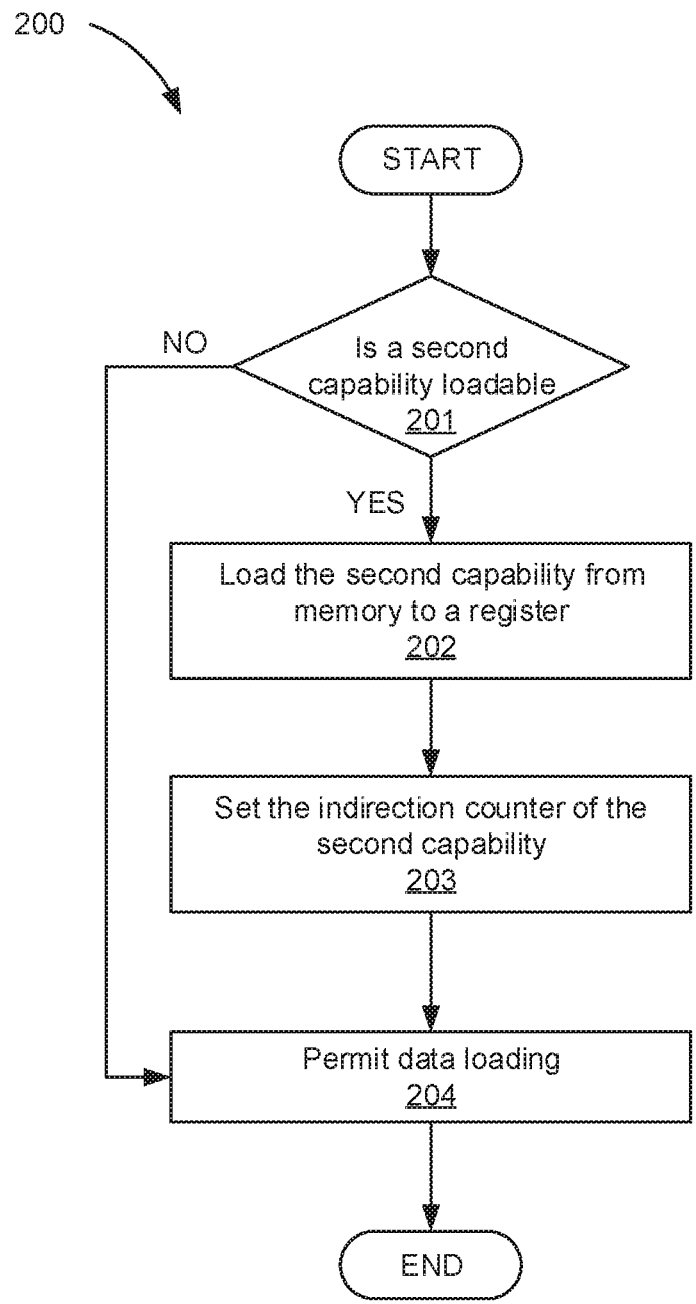
FIG. 2 is a flowchart of a method for enforcing memory reference object (MRO) loading indirection, according to an example of the principles described herein.

FIG. 2 is a flowchart of a method (200) for enforcing memory reference object (MRO) loading indirection, according to an example of the principles described herein. Specifically, the method (200) describes indirection control of capabilities, which are a specific example of a memory reference object (MRO). In this example, it is determined if a second capability is loadable (block 201). That is, from a first MRO that is loaded in a register, it is determined if a second capability is loadable (block 201). If not, (block 201, determination NO), subsequent capability loading is prohibited.

If a second capability is loadable, i.e., the indirection counter of the first capability is greater than zero, the second capability is loaded (block 202) and its indirection counter set to one less than the capability that loaded it, i.e., the first capability. When the second, or another, capability's indirection counter is set to zero, subsequent capability loading is prevented. However, even if capability loading is prevented, data loading is still permitted (block 204). Returning to the example of a social network represented as a graph data structure. Once an individual reaches a 2-deep level of indirection on a social network, i.e., a $3^{rd}$ degree connection, they cannot access another friend further away, but can view information about the $3^{rd}$ degree connection.

Figure 3:
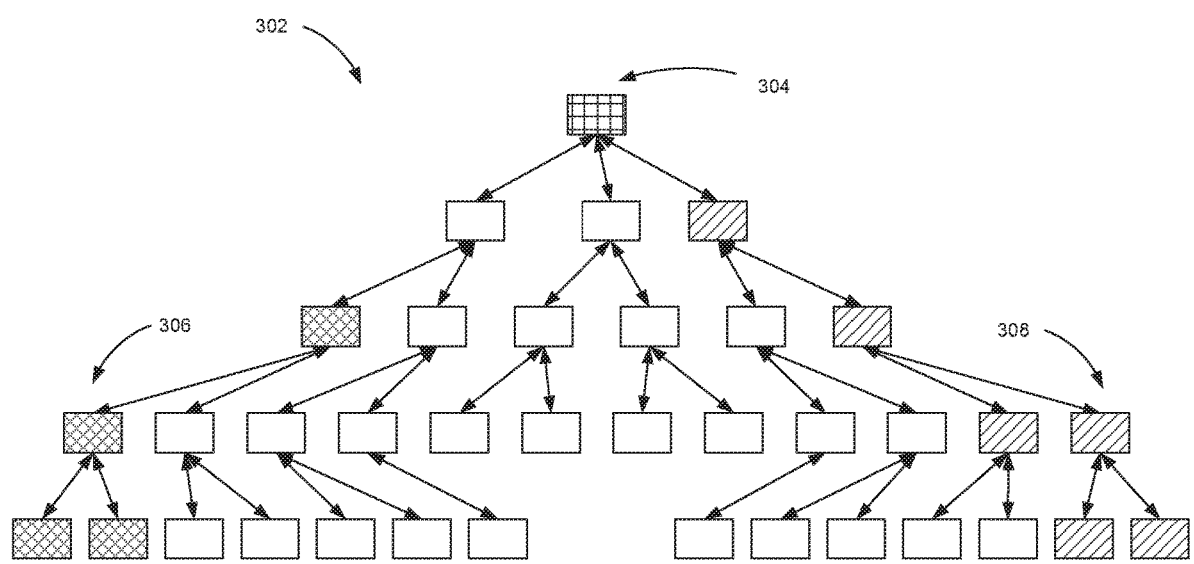
FIG. 3 is a diagram illustrating the access to graph nodes based on different levels of indirection, according to an example of the principles described herein.

FIG. 3 is a diagram of a graph data structure (302), according to an example of the principles described herein. Clearly indicated in the graph data structure (302) are the various nodes and edges that make up the structure. FIG. 3 depicts the effect of various degrees of indirection control. For example, in a first case (304) a single degree of indirection is permitted. Accordingly, a particular number of the nodes are accessible, which nodes are indicated by a checked pattern.

A second case (306) has two degrees of indirection permitted. Accordingly, more nodes are accessible, as indicated by the angled checked pattern, as compared to the number of nodes accessible in the first case (304).

Still further, a third case (308) has three degrees of indirection permitted. Accordingly, more nodes are accessible, as indicated by the dashed boxes, as compared to the number of nodes accessible in the first case (304) and the second case (306).

Figure 4:
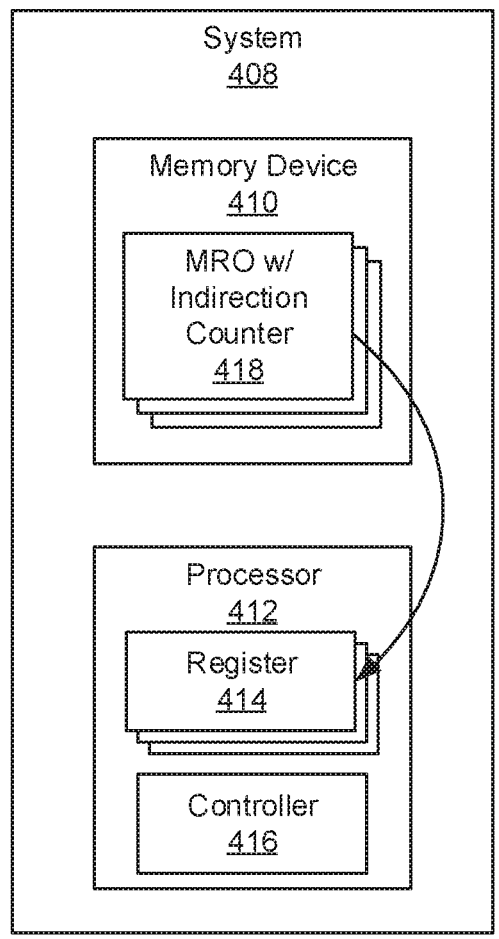
FIG. 4 is a block diagram of a system for enforcing memory reference object (MRO) loading indirection, according to an example of the principles described herein.

FIG. 4 is a block diagram of a system (408) for enforcing memory reference object (MRO) (418) loading indirection, according to an example of the principles described herein. The system (408) includes a memory device (410) which may be any type of memory device (410) that can store data and MROs (418) long term. The memory device (410) includes a number of MROs (418). Each MRO (418) includes an indirection counter to indicate a level of indirection allowed. As described above, this indirection counter is altered. Specifically, the MRO (418) may be loaded into hardware registers (414) of a processor (412). As indicated in FIG. 4, the processor (412) includes multiple registers (414). In some examples, the loading MRO (418) will be loaded to the same register (414) that contains the loaded MRO (418). However, in some cases, the loading MRO (418) will be stored in another register (414). Note that in this example, it is not a single indirection counter corresponding to a register (414) that is updated, rather, a new loaded MRO (418) has its indirection value updated based on the loading and loaded MRO (418). Note also that it is the copy of the MRO that is loaded to the register (414) that is updated, and not the MRO 418 as it is stored in the memory device (410).

While in the registers (414), the indirection counter of an MRO (418) is altered based on the MRO (418) from which it was loaded. In addition to the registers (414), the processor (412) includes a controller (416) which executes instructions to enforce an allowed level of indirection on the graph data structure (FIG. 3, 302). That is, the controller (416) enforces the rules that indicate how indirection counters for various MROs (418) are to be changed. Accordingly, as can be seen, the present application describes hardware, i.e., processor (412) and associated register (414) that enforce capabilities limitations. By doing so through the hardware, a more simple and efficient enforcement mechanism is established.

In addition to changing the indirection counter bits of MROs (418), the controller (416) also includes hardware that prohibits further MRO (418) loading.

In some examples, as described above, varying rules may be applied to determine how to change the corresponding indirection counters. For example different MROs (418) may have different initial indirection counter values. Accordingly, the controller (416) may perform arithmetic to combine indirection counter values, which arithmetic is defined by rules stored in the register (414) on the processor (412).

Figures 5A, 5B, 5C, 5D:
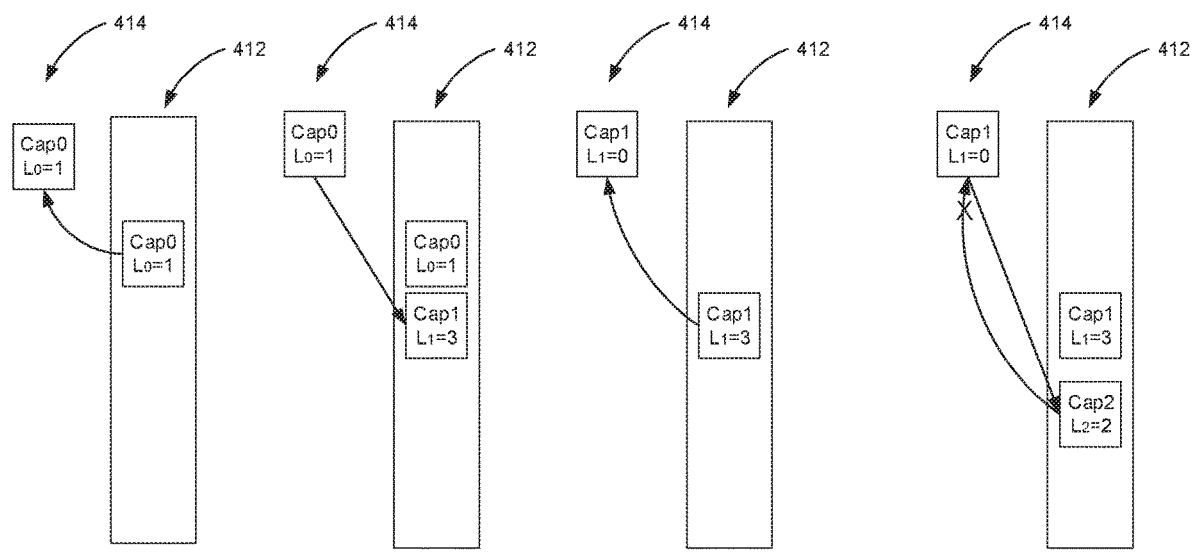
FIGS. 5A-5D are diagrams of enforcing memory reference object (MRO) loading indirection, according to an example of the principles described herein.

FIGS. 5A-5D are diagrams of enforcing memory reference object (MRO) (FIG. 4, 418) loading indirection, according to an example of the principles described herein. Specifically, FIGS. 5A-5O depict the loading of a capability. As described above, a capability may reside within a memory device (412) of a computing device. The processor register (414) may load the capability based on a call from an application, which loading is indicated in FIG. 5A. Note that FIGS. 5A-5D depict a single register (414) but as described above, the system may implement multiple registers (414). That is, different capabilities may be loaded to different registers (414).

In this example, the initial indirection counter for the first capability, Cap0 as it is stored in the registers (414), is 1; that is $L_0=1$. Continuing this example, Cap0 may reference a second capability, Cap1, which is also stored in memory (412) as depicted in FIG. 5B and has an initial indirection counter of $L_1=3$. As depicted in FIG. 5C, this second capability, Cap1, is loaded into the processor register (414). Moreover, as this is a capability loaded from another capability, the indirection counter for the second capability, Cap1 in the register (414), is set to 0, i.e., $L_1=0$ in the register (414). Accordingly, as depicted in FIG. 5D, the second capability, Cap1, references a third capability, Cap2 which has an initial indirection counter of $L_2=2$. However, this third capability, Cap2, is prevented from being loaded. For example, by invalidating a capability counter in the second capability, Cap1.

In summary, using such an indirection enforcing system 1) provides hardware support for enforcing level of indirection in traversing data structures with pointers; 2) provides a simple interface for such enforcement; 3) provides a more secure data navigation structure; and 4) provides for customization in limiting MRO indirection. However, it is contemplated that the systems and methods disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method, comprising:
    determining, at a register of a plurality of registers and from a first indirection counter of a first memory referencing object (MRO) in one of a plurality of registers of a processor of a computing device, whether a second MRO is loadable;
    when the first indirection counter of the first MRO indicates that the second MRO is loadable:
        loading the second MRO from the memory device to the register of the plurality of registers, wherein the second MRO comprises a second indirection counter;
        changing, at the register of the plurality of registers that contains the second MRO, the second indirection counter of the second MRO based on the first indirection counter of the first MRO to enforce MRO loading indirection; and
    when the first indirection counter or the second indirection counter reaches zero, prohibiting loading of a third MRO by invalidating a capability loading indicator of the third MRO.

2. The method of claim 1, further comprising:
    setting the second indirection counter of the second MRO to a value one less than the first indirection counter of the first MRO.

3. The method of claim 1, further comprising:
    determining priority between the first indirection counter of the first MRO and the second indirection counter of the second MRO, wherein changing the second indirection counter comprises setting the second indirection counter based on the determined priority.

4. The method of claim 1, further comprising:
    unlocking the second indirection counter, wherein unlocking the second indirection counter is associated with a rule that permits navigation to the second MRO in a graph data structure.

5. The method of claim 1, further comprising:
    continuing to permit data loading when the first indirection counter reaches zero.

6. The method of claim 1, further comprising:
    determining priority between the first indirection counter and the second indirection counter, wherein determining the priority is associated with a rule that reviews an ability of the first MRO or the second MRO to load subsequent MROs.

7. The method of claim 1, wherein the capability loading indicator is a capability loading bit that indicates that the first MRO is permitted to load a pointer to data from the memory device.

8. The method of claim 1, wherein the third MRO is loaded when the first indirection counter or the second indirection counter is not zero and the capability loading indicator of the third MRO is valid.

9. The method of claim 1, further comprising:
    when the loading of the third MRO is prohibited, continuing to permit data loading from the memory device.

10. The method of claim 1, wherein the first MRO is configured to load the second MRO from the memory device, and the second MRO is configured to load data from the memory device.

11. A system, comprising:
    a memory device comprising:
        a plurality of memory referencing objects (MROs), wherein the plurality of MROs comprise a first MRO and a second MRO, wherein the first MRO comprises a first indirection counter, wherein the second MRO comprises a second indirection counter, and wherein the first indirection counter is altered; and
    a processor comprising:
        a plurality of registers to load the plurality of MROs from the memory device; and
        a controller, wherein the controller is to:

load the second MRO from the memory device to a register of the plurality of registers, wherein the second MRO comprises the second indirection counter;

change, at the register of the plurality of registers that contains the second MRO, the second indirection counter of the second MRO based on the first indirection counter of the first MRO to enforce MRO loading indirection; and when the first indirection counter or the second indirection counter reaches zero, prohibit loading of a third MRO by invalidating a capability loading indicator of the third MRO.

12. The system of claim 11, wherein changing the second indirection counter of the second MRO comprises setting the second indirection counter of the second MRO to a value one less than the first indirection counter of the first MRO.

13. The system of claim 11, wherein an initial indirection counter value for the first MRO permits one subsequent MRO load.

14. The system of claim 11, wherein the first MRO and the second MRO are associated with different initial indirection counter values.

15. The system of claim 11, wherein the first indirection counter indicates a number of subsequent MROs to be loaded from the memory device.

16. A method, comprising:

determining, at a register of a plurality of registers and from a first indirection counter of a first capability in the register of the plurality of registers of a processor of a memory device, whether a second capability is loadable;

when the first indirection counter of the first capability indicates that the second capability is loadable:

loading the second capability from the memory device to the register of the plurality of registers, wherein the second capability comprises a second indirection counter;

changing, at the register of the plurality of registers that contains the second capability, the second indirection counter of the second capability to a value one less than the first indirection counter of the first capability; and permitting data loading when the first indirection counter reaches zero.

17. The method of claim 16, wherein the first indirection counter indicates a number of subsequent capabilities to be loaded from the memory device.

* * * * *